United States Patent [19]
Ema et al.

[11] Patent Number: 5,988,800
[45] Date of Patent: Nov. 23, 1999

[54] INK JET PRINTING HEAD AND APPARATUS INCORPORATING THE SAME

[75] Inventors: Yasushi Ema; Hisayoshi Fujimoto; Nobuhisa Ishida; Toshio Amano; Akihiro Shimokata; Shinsaku Takada, all of Kyoto, Japan

[73] Assignee: Rohm Co., Ltd., Kyoto, Japan

[21] Appl. No.: 07/992,040

[22] Filed: Dec. 17, 1992

[30] Foreign Application Priority Data

Dec. 27, 1991 [JP] Japan ............................ 3-346101

[51] Int. Cl.⁶ ........................................ B41J 2/045
[52] U.S. Cl. ........................................ 347/70
[58] Field of Search ................. 346/140 R; 347/40, 347/70, 71, 44, 47; B41J 2/045, 2/165

[56] References Cited

U.S. PATENT DOCUMENTS

| | | | |
|---|---|---|---|
| 4,158,847 | 6/1979 | Heinzl et al. | 346/140 R |
| 4,189,734 | 2/1980 | Kyser et al. | 346/1.1 |
| 4,216,483 | 8/1980 | Kyser et al. | 346/140 R |
| 4,312,008 | 1/1982 | Taub et al. | 347/71 |
| 4,367,480 | 1/1983 | Kotoh | 346/140 R |
| 4,420,764 | 12/1983 | Okada | 346/140 R |
| 4,471,363 | 9/1984 | Hanaoka | 346/140 R |
| 4,520,374 | 5/1985 | Koto | 346/140 R |
| 4,521,788 | 6/1985 | Kimura et al. | 347/40 X |
| 4,525,728 | 6/1985 | Koto | 346/140 R |
| 4,528,575 | 7/1985 | Matsuda et al. | 346/140 R |
| 4,584,590 | 4/1986 | Fischbeck | 346/140 R X |
| 4,641,153 | 2/1987 | Cruz-Uribe | 346/140 R |
| 4,774,529 | 9/1988 | Paranjpe et al. | 347/43 |
| 4,825,227 | 4/1989 | Fischbeck et al. | 346/140 R X |
| 5,057,853 | 10/1991 | Fisher | 356/140 |
| 5,157,420 | 10/1992 | Naka et al. | 347/40 |
| 5,216,442 | 6/1993 | Parks et al. | 346/140 R X |

FOREIGN PATENT DOCUMENTS

| | | | |
|---|---|---|---|
| 0468068 | 1/1992 | European Pat. Off. | B41J 2/16 |
| 57-182452 | 11/1982 | Japan . | |
| 58-108163 | 6/1983 | Japan . | |
| 2-86649 | 3/1990 | Japan | 347/47 |
| 2-223450 | 9/1990 | Japan | 347/47 |
| 2-289352 | 11/1990 | Japan | 347/70 |
| 3-32847 | 2/1991 | Japan . | |
| 383648 | 4/1991 | Japan | 347/68 |
| 4-153041 | 5/1992 | Japan | B41J 2/045 |

Primary Examiner—Benjamin R. Fuller
Assistant Examiner—C. Dickens
Attorney, Agent, or Firm—Wolf, Greenfield & Sacks, P.C.

[57] ABSTRACT

An ink jet printing head which both realizes a higher density and prevents a failure in ink jetting and deterioration in the printing quality. A photosensitive glass substrate which allows anisotropic etching is provided with a multiplicity of individual ink passages each having a narrow width and a large depth formed in an array by anisotropic etching in such a manner that each extends from the rear end of the glass substrate to the forward end thereof. A diaphragm is attached to the surface of the glass plate on which the individual ink passages are formed in such a manner as to cover all the individual ink passages. A common electrode is provided on the diaphragm, and individual piezoelectric elements are fixed to the common electrode at the portions corresponding to the individual ink passages. Individual electrodes are provided on the respective individual piezoelectric elements.

When a voltage is applied to the common electrode and the individual electrode, the portion of the diaphragm corresponding to the individual electrode is bent and deformed, so that the ink storing capacity of the corresponding individual ink passage is reduced and some of the ink in the individual ink passage is forced out.

20 Claims, 9 Drawing Sheets

INK JET PRINTING HEAD AND APPARATUS INCORPORATING THE SAME

BACKGROUND OF THE INVENTION

1. Field of the Invention

The present invention relates to an ink jet printing head and an electronic machine incorporating an ink jet printing head such as, for example, a printer, a word processor, a facsimile machine or a plotter.

2. Description of the Related Art

Ink jet printing heads of a Kyser system are disclosed in U.S. Pat. Nos. 4,216,483, 4,189,734 and 4,158,847. As shown in FIG. 15, a printing head of a Kyser system is generally composed of: a multiplicity of individual ink passages 104, each including a supply passage 101, a pressure chamber 102 and an end portion 103, provided on a photosensitive glass substrate 100 at regular intervals; a diaphragm 110 (omitted in FIG. 15, see FIG. 16) attached to the glass substrate 100 in such a manner as to cover all the individual ink passages 104; and piezoelectric elements 120 attached to the diaphragm 110 at the positions corresponding to the respective pressure chambers 102 of the individual ink passages 104. The individual ink passages 104, the diaphragm 110 and the piezoelectric elements 120 are generally provided on both sides of the glass substrate 100 in order to enhance the degree of integrity as shown in FIG. 16, and the printing head is disposed in an inclined manner with respect to the direction of printing.

In such a printing head, an electric field is applied to the piezoelectric element 120 so as to displace it, whereby the corresponding portion of the diaphragm 110 is moved, thereby forcing ink out of the end portion 103 of the corresponding individual ink passage 104.

In this type of printing head, a glass substrate which allows isotropic etching is generally used, and the individual ink passages are formed on the glass substrate by isotropic etching. However, it is difficult to control the etching depth in isotropic etching, so that in order to increase the depth of the individual ink passage (the dimension of the individual ink passage perpendicular to the direction of extension and to the direction of array), it is necessary to increase the width of the individual ink passage (the dimension of the individual ink in the direction of array). On the other hand, in order to increase the density of the printing head, it is necessary to reduce the width of the individual ink passage. With due consideration of these conflicting requirements, in this type of conventional printing head, the depth of the individual ink passage is increased as much as possible while realizing a certain degree of high density.

Nevertheless, since isotropic etching is adopted, it is inevitable that the depth of etching (the depth of the individual ink passage) is insufficient. Especially, in the case of forming the pattern of the individual ink passages such as that shown in FIG. 2 in order to enhance the density, the narrower the width of the individual ink passage 104 is made, the smaller the depth thereof becomes, as shown in FIG. 13, which is the sectional view of the individual ink passage shown in FIG. 2, taken along the line 10—10. If the depth of the individual ink passage becomes small, the resistance of the passage against the flow of ink increases, which leads to various problems. For example, it is impossible to jet ink, it is necessary to raise the driving voltage for the piezoelectric element, or it is impossible to increase the driving frequency for the piezoelectric element.

In isotropic etching, since the individual ink passage is inevitably shallow, the cross section of the end portion 103 of the individual ink passage 104 is a semicircle, as shown in FIG. 14. This causes inconveniences such as nonuniformity in the shapes of ink droplets, satellite phenomenon (ink dribbles after it is jetted) or instability in the direction of ink jetting, thereby lowering the printing quality.

SUMMARY OF THE INVENTION

Accordingly, it is an object of the present invention to provide an ink jet printing head which has a higher density while solving the problems such as a failure in ink jetting and lowering in the printing quality, and to provide an apparatus incorporating such an ink jet printing head.

To achieve this aim, an ink jet printing head according to the present invention comprises: a photosensitive glass substrate which allows anisotropic etching; a multiplicity of individual ink passages formed in an array on the glass substrate by anisotropic etching in such a manner that each extends from the rear end of the glass substrate to the forward end thereof; a diaphragm attached to the surface of the glass plate on which the individual ink passages are formed in such a manner as to cover all the individual ink passages; and a diaphragm displacing means for displacing the portions of the diaphragm which correspond to the individual ink passages.

In the printing head of the present invention, since the photosensitive glass substrate which allows anisotropic etching is used and the individual ink passages are formed by anisotropic etching, it is easy to control the etching depth without being influenced by the etching width. Therefore, it is possible to increase the depth of the individual ink passage even if the width of the individual ink passage is reduced, so that the resistance of the passage against the flow of ink is not increased. Thus, it is possible to realize the high density of printing head without causing a problem such as a failure in ink jetting.

In addition, since it is possible to set the ratio of the depth and the width of the end portion of the individual ink passage to be depth/width=approximately 1 or more, non-uniformity in the shapes of ink droplets and satellite phenomenon are prevented, so that the printing quality is enhanced.

In the printing head of the present invention, the diaphragm is displaced by a diaphragm displacing means so as to increase or reduce the ink storing capacity of the individual ink passage and jet some of the ink from the individual ink passage in which the ink storing capacity of the individual ink passage is reduced. Examples of the diaphragm displacing means are as follows.

Example 1: a means including individual piezoelectric elements fixed to the portions of the diaphragm which correspond to the respective individual ink passages, and electrodes provided on both surfaces of the individual piezoelectric elements so as to apply an electric field to the individual piezoelectric elements.

Example 2: a means including a piezoelectric element which is fixed to the diaphragm, and electrodes provided on a single or both surfaces of the piezoelectric element at the portions which correspond to the individual ink passages so as to apply an electric field to the corresponding portions of the piezoelectric element.

Example 3: a means including a piezoelectric element which is fixed to the diaphragm, and an electrode provided on a single or both surfaces of the piezoelectric element so as to apply an electric field to the piezoelectric element, the single or both surfaces of the piezoelectric element being grooved so as to divide the electrode into electrodes which correspond to the individual ink passages.

The ratio of the depth d and the width at the end portion of the individual ink passage is approximately d/w=1 or more, but the ratio of about 2 (that is, the depth is two times the width) is suitable for practical use.

The above and other objects, features and advantages of the present invention will become clear from the following description of the preferred embodiments thereof, taken in conjunction with the accompanying drawings.

DESCRIPTION OF THE PREFERRED EMBODIMENTS

The ink jet printing head and an electronic machine provided therewith according to the present invention will now be explained with reference to the embodiments.

Figure 1:
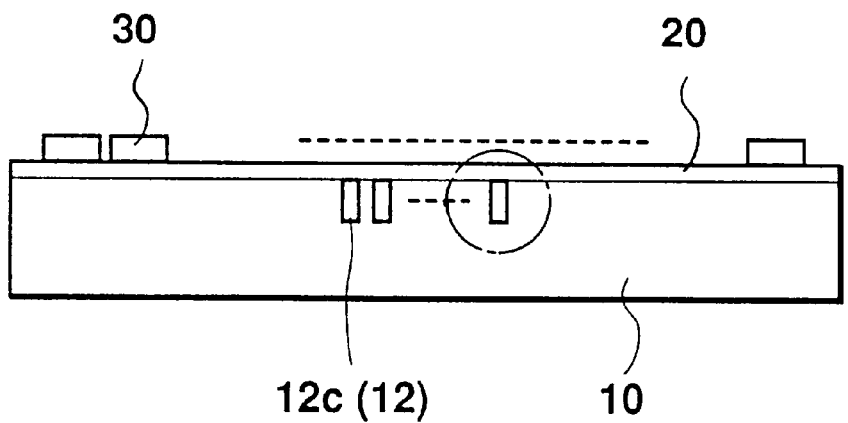
FIG. 1 is an elevational view of a first embodiment of a printing head according to the present invention.

FIG. 1 is an elevational view of a first embodiment of a printing head according to the present invention which is mounted in an electronic machine such as a printer or a word processor. Since the structure of the electronic machine except for the printing head is much the same as that of a conventional one, the printing head will mainly be described hereinunder. The printing head shown in FIG. 1 adopts the diaphragm displacing means in Example 1. The printing head is composed of a photosensitive glass substrate 10 with a multiplicity of individual ink passages 12 having a passage pattern shown in FIG. 2 formed thereon, a diaphragm 20 pasted to the glass substrate 10 in such a manner as to cover all the individual ink passages 12, and individual piezoelectric elements 30 fixed to the diaphragm 20 at the respective portions corresponding to the individual ink passages 12.

Figure 2:
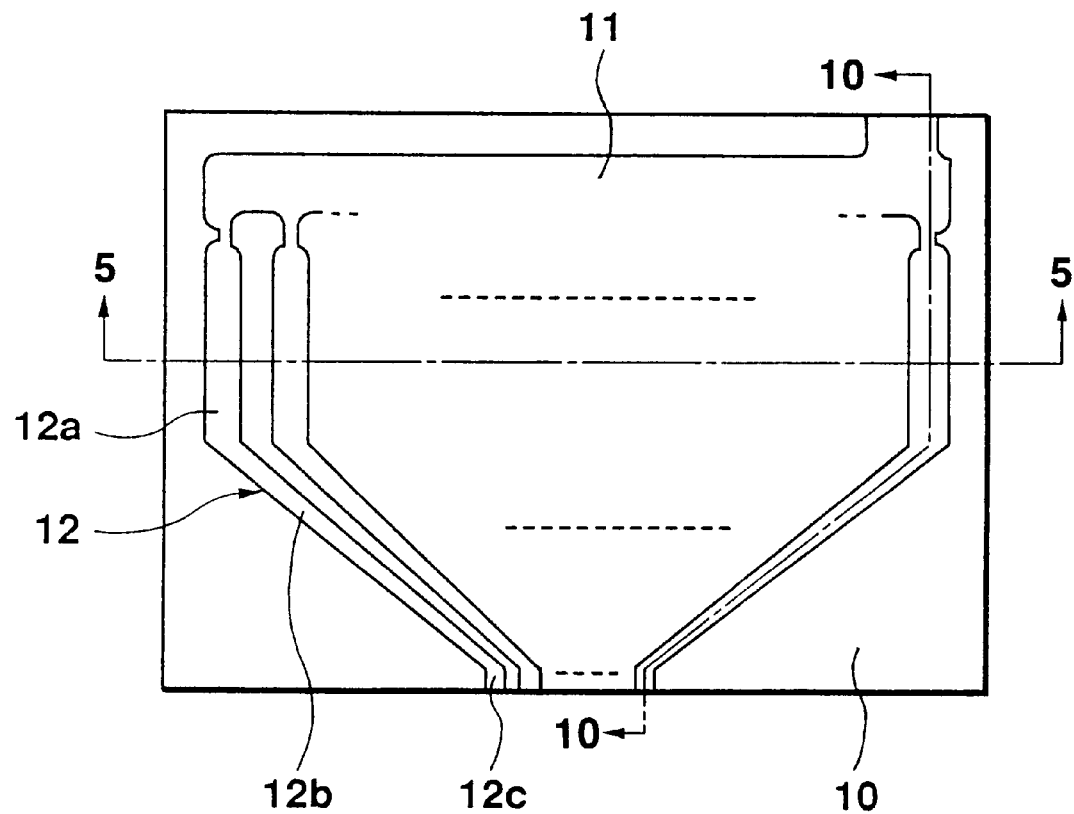
FIG. 2 is a plan view of a glass substrate in the first embodiment shown in FIG. 1.

The glass substrate 10 allows anisotropic etching, and the individual ink passages 12 are formed by anisotropic etching. In FIG. 2, the individual ink passage 12 extends from the rear end of the glass substrate 12 to the forward end thereof, and it is composed of a pressure chamber 12a, a tapered portion 12b and an end portion 12c which functions as a nozzle. In order to increase the density of the printing head, the end portions 12c are converged into the front end surface of the glass substrate 10. Therefore, the tapered portion 12b is obliquely extended toward the end portion 12c. All the individual ink passages 12 communicate with a common ink passage 11 which is formed at the rear end portion of the glass substrate 10. Ink therefore flows from the common ink passage 11 to the end portion 12c through the pressure chamber 12a and the tapered portion 12b.

The individual piezoelectric elements 30 each of which has a shape and a size similar to those of the pressure chamber 12a of the individual ink passage 12 are situated above the pressure chamber 12a. On the upper surface of the diaphragm 20 situated over the pressure chambers 12a of all the individual ink passages 12, a common electrode (not shown in FIG. 1) is provided by ITO or the like, and individual electrodes (not shown in FIG. 1) are provided on the upper surfaces of the respective individual piezoelectric elements 30.

Figure 3:
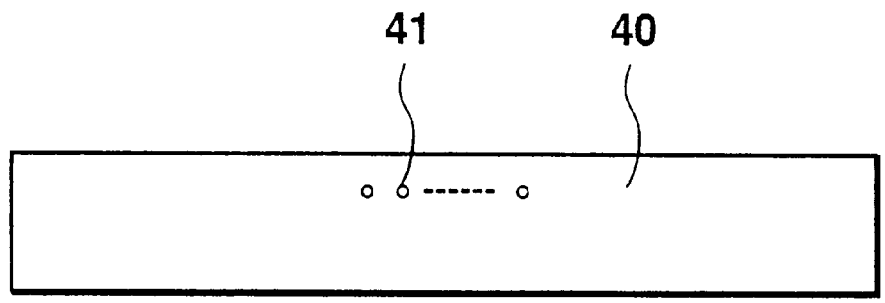
FIG. 3 is an elevational view of a nozzle plate incorporated into a printing head according to the present invention.

In this embodiment, a nozzle plate 40 such as that shown in FIG. 3 is attached to the front end surface of the glass substrate 10. The nozzle plate 40 has the same number of holes 41 as the number of end portions 12c of the individual ink passages 12. The hole 41 has a circular cross section, so that the ink droplet becomes spherical, which is a stable shape, thereby enhancing the printing quality. The nozzle plate 40, however, is not essential.

Figure 4:
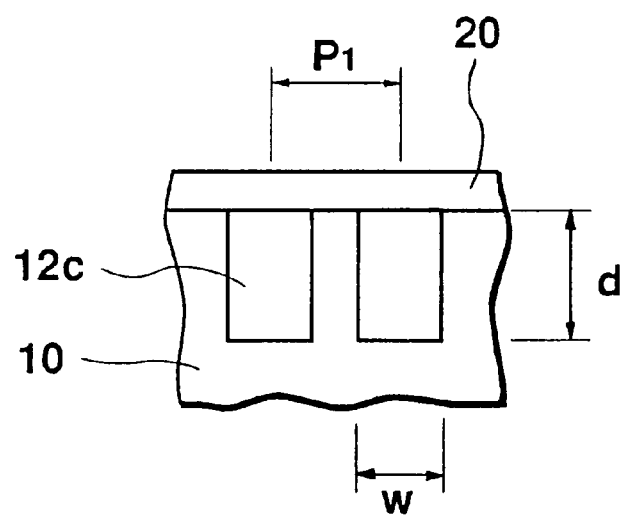
FIG. 4 is an enlarged view of the portion of the first embodiment shown in FIG. 1 which is encircled with an alternate short and long dash line.
Figure 10:
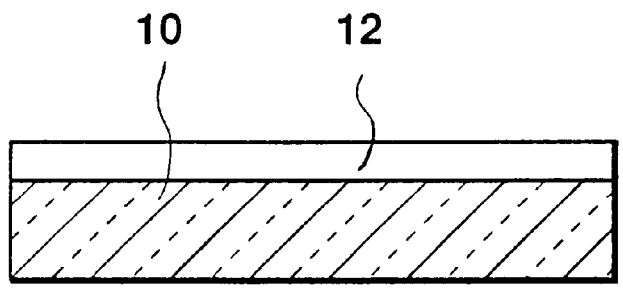
FIG. 10 is a sectional view of the glass substrate shown in FIG. 2, taken along the line 10—10.
Figure 14:
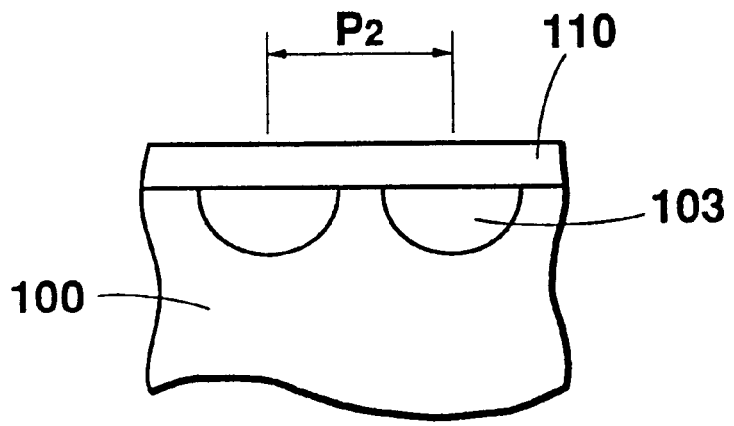
FIG. 14 is an enlarged view of the end portions of conventional individual ink passages as compared with those according to the present invention shown in FIG. 4.
Figure 15:
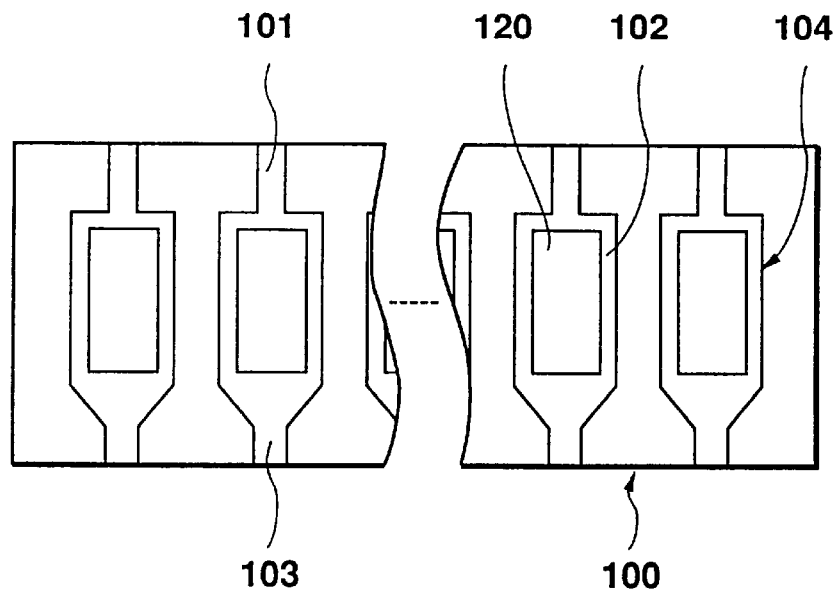
FIG. 15 is a partially cutaway plan view of a conventional printing head of a Kayser system.
Figure 16:
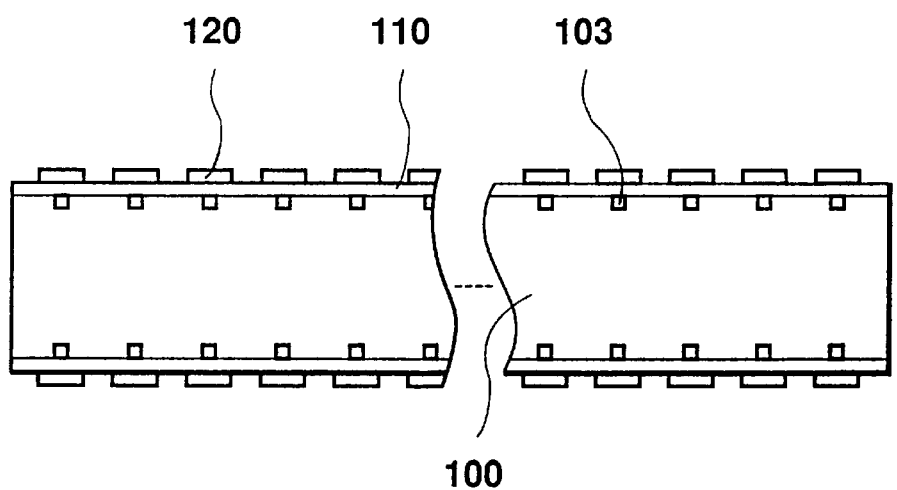
FIG. 16 is a partially cutaway side elevational view of the printing head shown in FIG. 15.

The portion encircled by an alternate short and long dash line in FIG. 1 is enlarged in FIG. 4. As is obvious from FIG. 4, in this embodiment, the end portion 12c of the individual ink passage 12 has a rectangular cross section and the ratio of the depth d and the width w thereof is set to be d/w=about 2 to 1. This is realized by adopting anisotropic etching for the formation of the individual ink passages 12. Anisotropic etching enables the etching depth to be increased irrespective of the etching width, as described above. The depth of the individual ink passage 12 is therefore made constant extending from the pressure chamber 12a, the tapered portion 12b to the end portion 12c, as shown in FIG. 10, which is a sectional view of the glass substrate shown in FIG. 2, taken along the line 10—10. Thus, it is possible to reduce the width of the individual ink passage 12 so as to increase the density of the printing head. Especially, it is possible to reduce the pitch $P_1$ of the end portion 12c to about 0.1 mm. In contrast, in the case of adopting isotropic etching, the cross section of the end portion 103 is a semicircle and the pitch $P_2$ thereof is at least about 0.2 mm, as shown in FIG. 14.

The process for forming the individual ink passages 12 by anisotropic etching, which is characteristic of the present invention, will now be explained.

Figure 11:
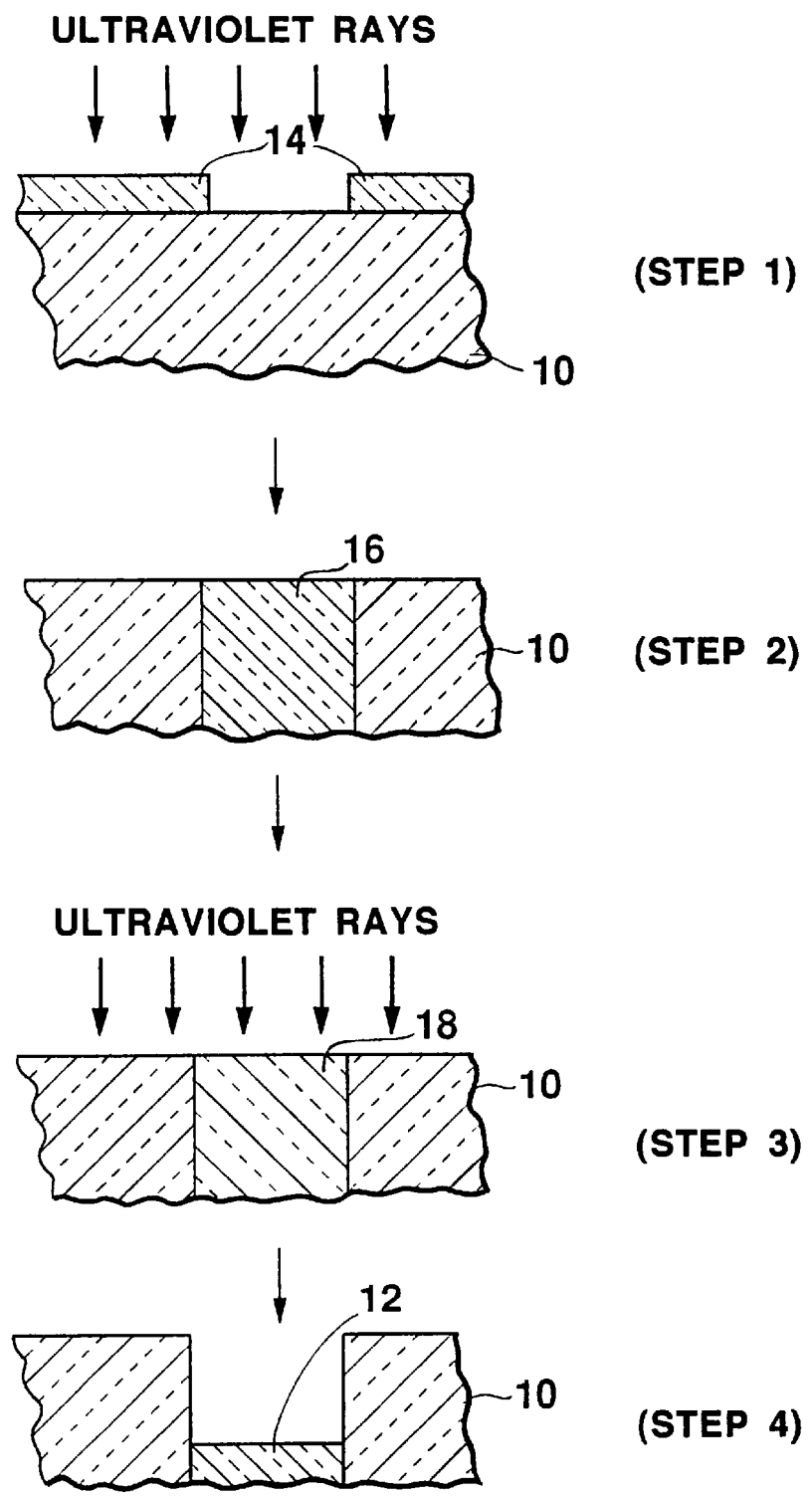
FIG. 11 is an explanatory view of the process for forming individual ink passages by anisotropic etching.

FIG. 11 shows the process for forming the individual ink passages 12 by anisotropic etching.

The glass substrate 10 used for this embodiment is photosensitive glass. The photosensitive glass is, for example, $SiO_2$—$Li_2O$—$AlO_3$ glass with a small amount of gold (Au), silver (Ag), copper (Cu), etc. added thereto as photosensitive metals and a small amount of $CeO_3$ as a sensitizer.

A mask 14 composed of quartz glass with a pattern of the individual ink passages 12 drawn thereon is placed on the glass substrate 10, and the portions at which the individual ink passages 12 are formed are irradiated with ultraviolet rays. Only in the direction of depth of the portions which are not covered with the mask 14 (the portions which constitute the individual ink passages 12), photoelectrons are emitted from $Ce^{3+}$ by the ultraviolet energy. A part of the photoelectrons are caught in voids in the structure of the glass and a part of them are caught by photosensitive ions to be neutralized or become metal atoms (i.e., a latent image is formed on the photosensitive glass) (Step 1) Thereafter, the mask 14 is removed.

The glass substrate 10 is then heat treated at a temperature of 450 to 600° C. As a result, the metals ($n(Me^0)$) such as gold, silver and copper are separated in the form of a metal colloid (($Me^0)_n$) only in the direction of depth of the exposed portions 16 which are not covered with the mask 14. The $Li^+$ ions of $Li_2O$ in the glass move with the metal colloid as the crystalline nuclei, so that lithium metasillicate ($Li_2O$—$SiO_2$) crystals are precipitated, thereby forming $Li_2O$—$SiO_2$ crystal precipitates 18 (i.e., the latent images are crystallized) (Step 2)

After the mask 14 is removed, the glass substrate 10 including the unexposed portions is further irradiated with ultraviolet rays. (Step 3)

Thereafter, the glass substrate 10 is dipped in diluted hydrofluoric acid (HF) for the purpose of etching. Since the solubility of the $Li_2O$—$SiO_2$ crystals in diluted hydrofluoric acid is high, only the $Li_2O$—$siO_2$ crystal precipitates 18 (i.e., the portions which are irradiated with ultraviolet rays at Step 1 and which constitute the individual ink passages 12) are dissolved by etching. In this way, it is possible to chemically cut the individual ink passages 12 accurately in the direction of depth at the same width. It is also possible to control the depth of the individual ink passage 12 by controlling the etching time. (Step 4)

If the whole glass substrate 10 with the individual ink passages 12 formed thereon is further irradiated with ultraviolet rays and heat treated at a high temperature such as 800 to 900° C., lithium disilicate ($Li_2O$—$2SiO_2$) crystals are precipitated on the whole glass substrate 10, which enhances the durability of the printing head both physically and chemically.

The optimum wavelength range of the ultraviolet rays used in the present invention is 300 to 320 nm, preferably 320 nm with due consideration of the sensitivity of the photosensitive glass used in this embodiment. In order to obtain the colloidal size which is large enough to be nuclei of the $Li_2O$—$SiO_2$ crystals, the exposure time is preferably 1 to 3 minutes.

Figure 5:
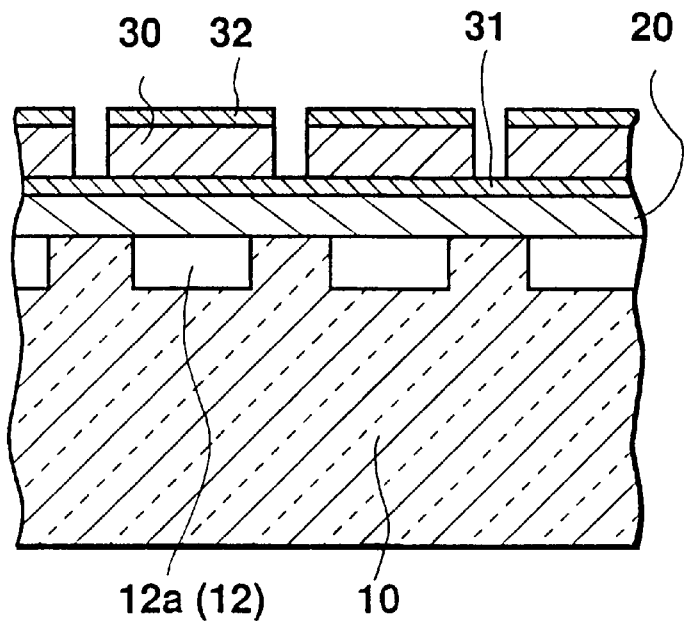
FIG. 5 is an enlarged sectional view of the main part of the glass substrate shown in FIG. 2, taken along the line 5—5.

The operation of the first embodiment of the printing head will now be described simply. FIG. 5 is an enlarged sectional view of the main part of the glass substrate shown in FIG. 2, taken along the line 5—5. In FIG. 5, when a voltage of an appropriate polarity is applied to a common electrode 31 composed of ITO (not shown) or the like and provided on the upper surface of the diaphragm 20, and an individual electrode 32 composed of silver, nickel, gold or the like and provided on both surfaces of the piezoelectric element 30, an electric field is applied to the piezoelectric element 30, so that the piezoelectric element 30 displaces toward the diaphragm 20. This displacement presses the portion of the diaphragm 20 corresponding to the pressure chamber 12a downward, thereby bending and deforming the corresponding portion. As a result, the ink storing capacity of the pressure chamber 12a is reduced and some of the ink in the pressure chamber 12a is forced out of the corresponding hole 41 of the nozzle plate 40 through the tapered portion 12b and the end portion 12c.

Figure 6:
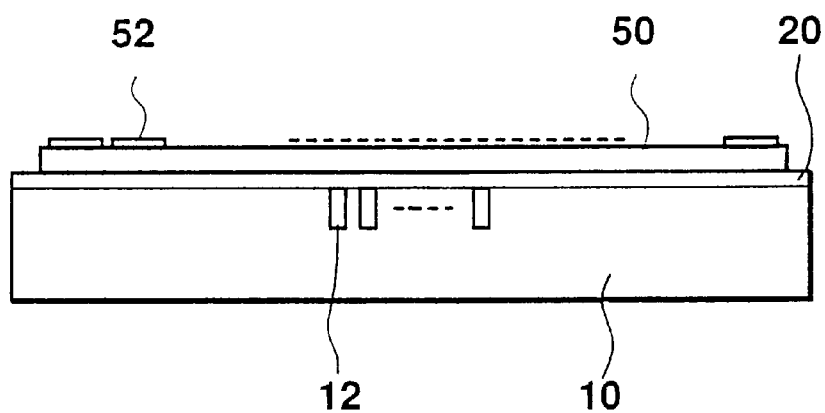
FIG. 6 is an elevational view of a second embodiment of a printing head according to the present invention.

FIG. 6 is an elevational view of a second embodiment of a printing head according to the present invention. This embodiment adopts the diaphragm displacing means in Example 2. The photosensitive glass substrate 10 with the individual ink passages 12 formed thereon and the diaphragm 20 pasted to the glass substrate 10 in this embodiment are completely the same as in the first embodiment. The second embodiment is characterized by the diaphragm displacing means which is composed of: a common electrode (not shown in FIG. 6) provided over the entire surface of the diaphragm 20 which is situated over the pressure chambers 12a of all the individual ink passages 12; a rectangular piezoelectric element 50 which is fixed on the common electrode and which is large enough to cover the pressure chambers 12a of all the individual ink passages 12; and individual electrodes 52 provided on the piezoelectric element 50 at the portions corresponding to the respective pressure chambers 12a.

Figure 7:
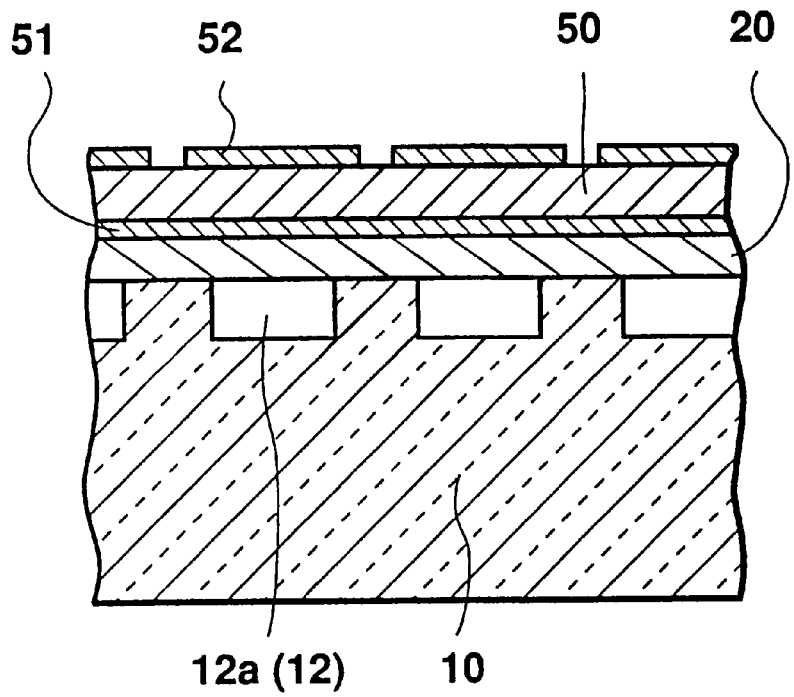
FIG. 7 is an enlarged sectional view of the main part of the second embodiment shown in FIG. 6.

FIG. 7 is an enlarged sectional view of the main part of the second embodiment shown in FIG. 6. As is clear from FIG. 7, this embodiment is characterized by the plate-like piezoelectric element 50 which covers the pressure chambers 12a.

The operation of this embodiment having the above-described structure is much the same as in the first embodiment. That is, when a voltage is applied to a common electrode 51 provided on the under surface of the piezoelectric element 50 and the individual electrode 52 provided on the upper surface of the piezoelectric element 50 through the common electrode (not shown) provided on the upper surface of the diaphragm 20, the portion which is sandwiched between the common electrode 51 and the individual electrode 52 is displaced downward. As a result, the portion of the diaphragm 20 corresponding to the pressure chamber 12a is deformed, so that the ink storing capacity of the pressure chamber 12a is reduced and some of the ink in the pressure chamber 12a is forced out.

Figure 8:
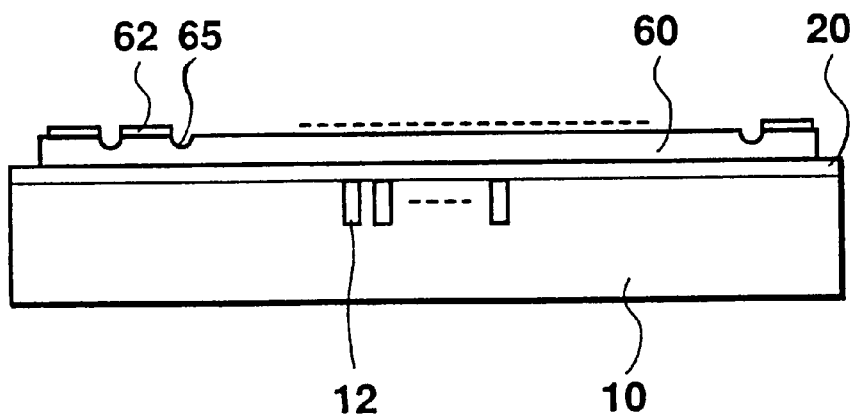
FIG. 8 is an elevational view of a third embodiment of a printing head according to the present invention.

FIG. 8 is an elevational view of a third embodiment of a printing head according to the present invention. This embodiment adopts the diaphragm displacing means in Example 3. The structures of the photosensitive glass substrate 10 and the diaphragm 20 are the same as in the first embodiment. In this embodiment, the diaphragm displacing means is composed of a piezoelectric element 60 which is fixed on the diaphragm 20, a common electrode (not shown in FIG. 8) provided on the upper surface of the diaphragm 20 and individual electrodes 62 provided on the upper surface of the piezoelectric element 60. The piezoelectric element 60 has a rectangular shape and covers the pressure chambers 12a of all the individual ink passages 12. The individual electrodes 62 are formed in the following way. A sheet of electrode is first provided in such a manner as to cover the entire upper surface of the piezoelectric element 60. Thereafter, the electrode is grooved in the direction of extension of the individual ink passage 12 to a depth of a part of the piezoelectric element 60 in addition to the whole depth of the electrode in order to form the individual electrodes 62 which correspond to the respective chambers 12a of the individual ink passages 12. In other words, the electrode is divided into the individual electrodes 62 by the thus-formed grooves 65.

Figure 9:
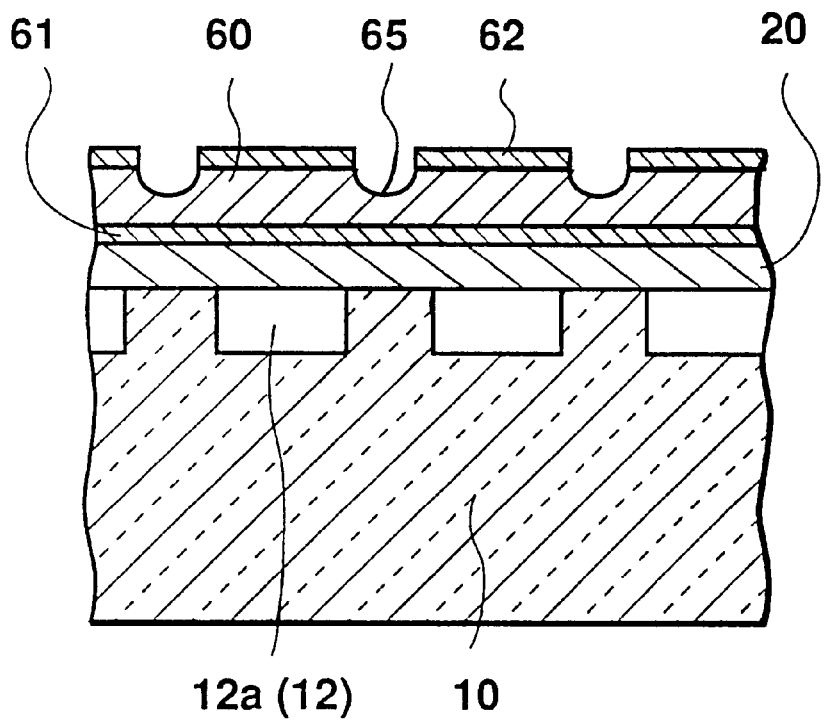
FIG. 9 is an enlarged sectional view of the main part of the third embodiment shown in FIG. 8.

FIG. 9 is an enlarged sectional view of the main part of the third embodiment. In the third embodiment, when a voltage is applied to a common electrode 61 and the individual electrode 62 through the common electrode (not shown) provided on the upper surface of the diaphragm 20, the portion which is sandwiched between the common electrode 61 and the individual electrode 62 is displaced downward in the same way as in the second embodiment. As a result, the portion of the diaphragm 20 corresponding to the pressure chamber 12a is bent toward the pressure chamber 12 and deformed, so that the ink storing capacity of the pressure chamber 12a is reduced and some of the ink in the pressure chamber 12a is forced out. In this embodiment, since the grooves are formed on the upper surface of the piezoelectric element 60, not only is the displacement responsiveness of the corresponding portion of the piezoelectric element 60 to the applied voltage more excellent than that in the embodiment shown in FIG. 7, but also the portion corresponding to the pressure chamber 12a which is not displaced is barely influenced by the displacement of a portion adjacent thereto.

These embodiments are described merely as an illustration, and various modifications may be made which fall within the true spirit and scope of the invention. For example, although the common electrode is provided on the diaphragm and the individual electrodes are provided on the piezoelectric element in each of these embodiments, the common electrode may be divided into the individual electrodes and the individual electrodes may be provided on both surfaces of the individual piezoelectric elements in the first embodiment. In the second embodiment, it is possible to provide the common electrode on the upper surface of the piezoelectric element and the individual electrodes on the under surface thereof. It is also possible to provide the individual electrodes on both surfaces of the piezoelectric element without providing the common electrode. Although the grooves are formed only on the upper surface side of the piezoelectric element in the third embodiment, grooves may also be formed on the under surface side of the piezoelectric element so as to provide the individual electrodes on both sides of the piezoelectric element. It is also possible to displace the diaphragm in a shear mode.

Figure 12A:
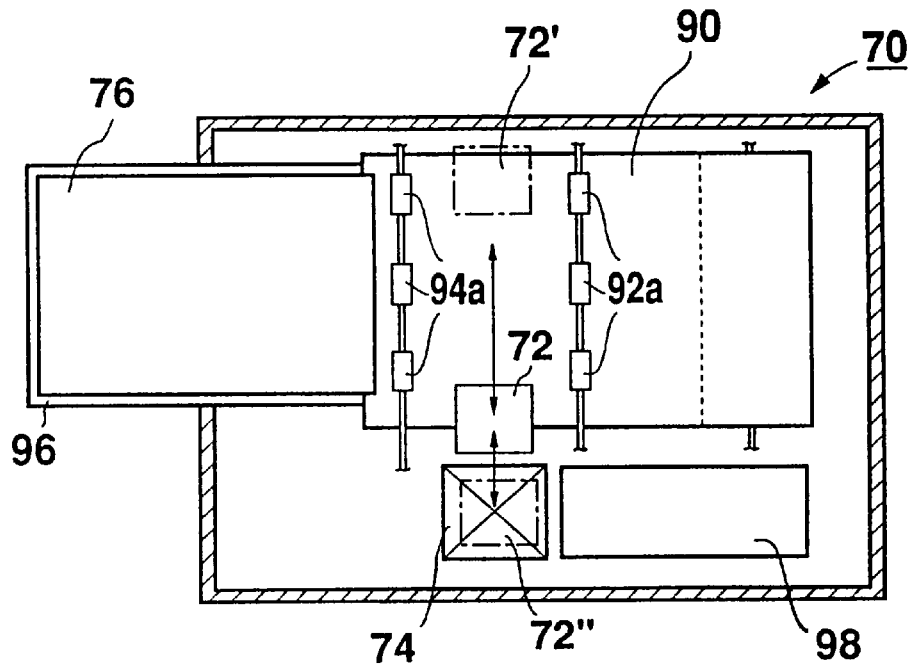
FIGS. 12A and 12B are a schematic explanatory views of the structure of an apparatus incorporating an ink jet printing head according to the present invention.
Figure 12B:
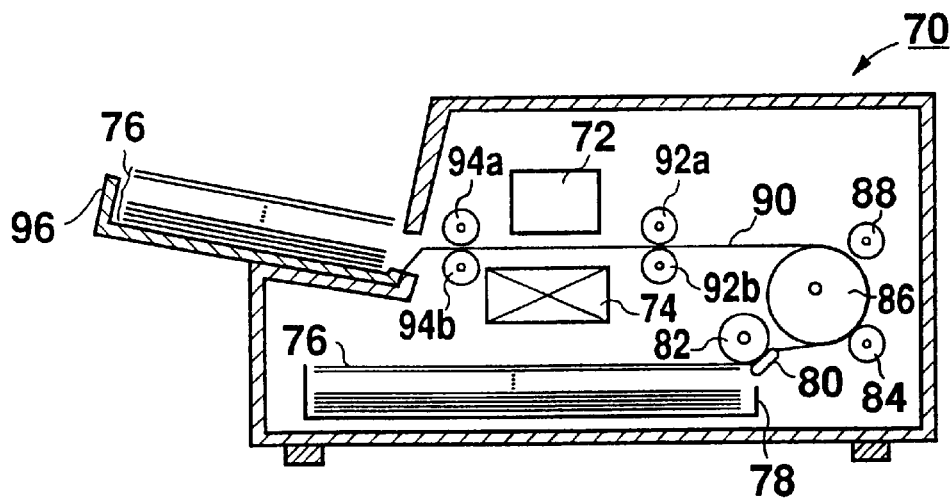
Figure 13:
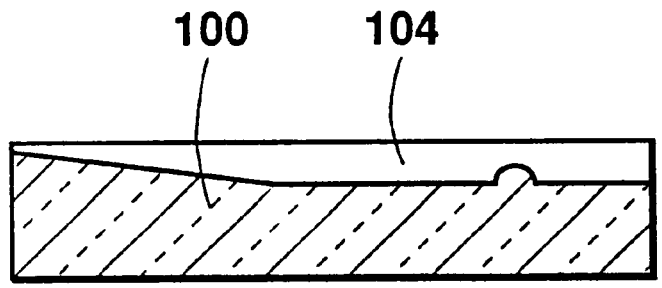
FIG. 13 is a sectional view of a conventional individual ink passage as compared with the individual ink passage according to the present invention shown in FIG. 10.

FIGS. 12A and 12B schematically show the structure of an apparatus incorporating an ink jet printing head according to the present invention. In this embodiment, an ink jet printer will be explained as an example of the apparatus incorporating an ink jet printing head.

FIG. 12A is a plan view of the ink jet printer and FIG. 12B is a side elevational view thereof. Referring to FIG. 12A, an ink jet printer 70 is composed of: a paper tray 78 on which paper 76 is placed in multilayers; a conveyor 90 for conveying the paper 76; an autofeeder 80 and a roller 82 for feeding a sheet of paper 76 to the conveyor 90; a roller 86 for feeding the conveyor 90; rollers 84, 88 for feeding the paper 76 as far as the print starting point; a pair of rollers 92a, 92b for feeding the paper 76 at the print starting point; an ink jet printing head 72 according to the present invention for jetting ink onto the paper 76 which is fed by the rollers 92a and 92b; a capping mechanism 74 for accommodating the ink jet print heads 72 and preventing the clogging of the nozzles thereof; and a pair of rollers 94a, 94b for feeding the printed paper 76 to a paper holder 96.

The operation of the ink jet printer 70 will now be explained. A sheet of the paper 76 is first supplied from the paper tray 78 to the conveyor 90 by the autofeeder 80 and the roller 82. The paper 76 is then fed as far as the print starting point by the rollers 84, 88. At the print starting point, after the ink jet printing head 72 is moved to the position indicated by the alternate long and short dash line 72' is printed while feeding the paper 76 by the pair of rollers 92a and 92b. Prior to the printing operation, the ink jet printing head 72 is cleaned in the capping mechanism 74, namely, at the positioin indicated by the alternate long and two short dashed line 72", and it is moved to the position indicated by the alternate long and short dash line 72' immediately before printing. Printing carried out by the ink jet printing head 72 is preferably two-way printing but it may also be serial printing.

When 20 to 30 lines are printed while feeding the paper head 72 is accommodated in the capping mechanism 74 so as to be cleaned, and thereafter printing is resumed.

When printing is finished, the paper 76 is discharged into the paper holder 96, and the ink jet printing head 72 is accommodated in the capping mechanism 74 so as to be cleaned. And then the capping mechanism 74 is capped.

The cleaning operation carried out in the capping mechanism 74 includes the operations of sucking a small amount of ink from the nozzles of the ink jet printing head 72, wiping off the ink attached to the nozzle surfaces, preliminarily jetting ink by applying a printing pulse to the ink jet printing head 72.

Although this embodiment has been explained while citing the ink jet printer as an example, this embodiment is not restricted to an ink jet printing head and is applicable to other apparatuses incorporating an ink jet printing head such as a word processor, a facsimile machine and a plotter.

The ink jet printing head of the present invention composed of a photosensitive glass substrate which allows anisotropic etching and individual ink passages formed on the photosensitive glass substrate by anisotropic etching, as described above, produces the following advantages.

(1) Since it is possible to control the etching depth irrespective of the etching width, it is possible to increase the depth of the individual ink passage even if the width thereof is narrow, thereby realizing a high-density printing head.

(2) Since it is possible to increase the depth of the individual ink passage and increase the cross sectional area thereof even if the width of the individual ink passage is narrow, the resistance of the individual ink passage against the flow of ink is small. Consequently, there is no failure in the ink jetting operation and it is possible to raise the driving frequency.

(3) Since the resistance of the individual ink passage against the flow of ink is small, a pattern of individual ink passages in which the piezoelectric elements are disposed apart from the end portion of the individual ink passages, in other words, the distance between the pressure chamber and the end portion of the individual ink passage is long, is possible, so that it is possible to arrange the piezoelectric elements in a line as shown in the first embodiment.

(4) Since it is possible to set the ratio of the depth and the width of the end portion of the individual ink passage to be depth/width=approximately 1 or more, the cross section of the end portion is a rectangle, thereby preventing the non-uniformity in the shapes of ink droplets or satellite phenomenon, and enhancing the printing quality.

(5) It is also possible to use one piezoelectric element and use it substantially as individual piezoelectric elements by patterning an electrode or grooving the piezoelectric element, as shown in the second and third embodiments. Consequently, the productivity is enhanced and the quality of the piezoelectric element is stabilized as compared with the case of attaching the individual piezoelectric element to each individual ink passage. In addition, it is possible to provide a small and cheap printing head.

(6) By attaching a nozzle plate having holes with a circular cross section which communicate with the end portions of the individual ink passages to the front end surface of the glass substrate, the ink droplet becomes spherical, which is a stable shape, thereby enhancing the printing quality.

What is claimed is:

1. An ink jet printing head comprising:
    (a) photosensitive glass substrate;
    (b) a plurality of individual ink passages formed in a linear array on said glass substrate by anisotropic etching so that each of said individual ink passages extends from a common ink passage at a first end of said glass substrate to a second end of the glass substrate, wherein each of the individual ink passages has a pressure chamber fluidly coupled to the common ink passage and a tapered portion fluidly coupled to a respective pressure chamber, wherein the tapered portions of the plurality of individual ink passages converge at the second end, and wherein a depth of each of said individual ink passages at the second end is larger than a width at the second end;
    (c) a diaphragm disposed above said glass substrate to cover all of said individual ink passages said diaphragm for forcing out ink in the individual ink passages when said diaphragm is bent or deformed; and
    (d) diaphragm displacing means disposed on said diaphragm above said individual ink passages for displacing portions of the said diaphragm which correspond to said individual ink passages;
  wherein a ratio of said depth and said width is at least 2.

2. An ink jet printing head according to claim 1, further comprising:
    a common electrode provided on said diaphragm to apply a voltage to said diaphragm displacing means.

3. An ink jet printing head according to claim 1, wherein said depth of each of said individual ink passages is constant in any part of each of said individual ink passages.

4. An ink jet printing head according to claim 1, further comprising a plate which is attached to a surface of at the second end said glass substrate and which is provided with circular holes communicating with an end portion of each said individual ink passages.

5. An ink jet printing head according to claim 1, wherein said diaphragm displacing means includes:
    individual piezoelectric elements corresponding to said individual ink passages, respectively; and
    an electrode group for applying an electric field to said individual piezoelectric elements including a first electrode formed between said individual piezoelectric elements and said diaphragm, and a second electrode formed above said individual piezoelectric elements.

6. An ink jet printing head according to claim 5, wherein one of said first electrode and said second electrode is a common electrode, and another of said first electrode and said second electrode includes individual electrodes corresponding to the individual ink passages.

7. An ink jet printing head according to claim 5, wherein said first electrode includes individual electrodes, and said second electrode includes individual electrodes formed above said individual piezoelectric elements, respectively.

8. An ink jet printing head according to claim 1, wherein said diaphragm displacing means includes:
    a piezoelectric element fixed to said diaphragm for covering upper portions of the pressure chambers of all of said individual ink passages; and
    an electrode group for applying an electric field to said piezoelectric element, the electrode group including a first electrode formed between said piezoelectric element and said diaphragm, and a second electrode formed above said piezoelectric element.

9. An ink jet printing head comprising:
    a glass substrate;
    a plurality of individual ink passages having a corresponding plurality of pressure chambers extending in a first direction, the pressure chambers being formed in an array in said glass substrate along a second direction substantially orthogonal to the first direction so that each of said individual ink passages extends from a rear end of said glass substrate to a forward end;
    a diaphragm connected to said glass substrate in a position covering all of said individual ink passages so that ink in selected individual ink passages is forced out of the ink passage when said diaphragm is deformed;
    diaphragm displacing means connected to said diaphragm in a position above said individual ink passages for displacing portions of said diaphragm which correspond to said individual ink passages;
    wherein said diaphragm displacing means includes:
    a single piezoelectric element positioned over said diaphragm to cover the pressure chambers of all of said individual ink passages, the piezoelectric element having grooves formed only part-way therethrough and extending in the first direction at locations over the glass substrate between adjacent individual ink passages; and
    electrode means for selectively applying an electric field to selected portions of the piezoelectric element.

10. An apparatus incorporating an ink jet printing head comprising:
    (a) paper tray on which paper is placed in multilayers;
    (b) a conveyor for conveying said paper which is supplied from said paper tray;
    (c) rollers for feeding said paper on said conveyor to a next stage;
    (d) a plurality of ink jet printing heads which are provided in a line across said conveyor to jet ink onto said paper which is fed by said rollers, each of said ink jet printing heads including:
        (i) a photosensitive glass substrate;
        (ii) a plurality of individual ink passages formed in an array on said glass substrate by anisotropic etching such that each of said individual ink passages extends from a rear end of said glass substrate to a forward end of said glass substrate and such that a depth of an end portion of each of said individual ink passages at said forward end is larger than a width;
        (iii) a diaphragm disposed above said glass substrate for covering all of said individual ink passages to force out some of the ink in the corresponding individual ink passage when said diaphragm is bent or deformed; and
        (iv) a diaphragm displacing means disposed on said diaphragm above said individual ink passages for displacing portions of the said diaphragm which correspond to said individual ink passages;
    (e) a capping mechanism for cleaning and accommodating said ink jet printing heads;
    wherein a ratio of said depth of the end portion of each of said individual ink passages to the width is greater than 2.

11. An apparatus incorporating an ink jet printing head according to claim 10, wherein said depth of each of said individual ink passages is constant in any part of each of said individual ink passages in said ink jet printing head.

12. An apparatus incorporating an ink jet printing head comprising:
(a) a paper tray on which paper is placed in multilayers;
(b) a conveyor for conveying said paper which is supplied from said paper tray;
(c) rollers for feeding said paper on said conveyor to a next stage;
(d) a plurality of ink jet printing heads which are provided in a line across said conveyor to jet ink onto said paper which is fed by said rollers, each of said ink jet printing heads including:
(i) a photosensitive glass substrate;
(ii) a plurality of individual ink passages formed in a linear array on said glass substrate by anisotropic etching so that each of said individual ink passages extends from a common ink passage at a first end of said glass substrate to a second end of the glass substrate, wherein each of the individual ink passages has a pressure chamber fluidly coupled to the common ink passage and a tapered portion fluidly coupled to a respective pressure chamber, wherein the tapered portions of the plurality of individual ink passages converge at the second end, and wherein a depth of each of said individual ink passages at the second end is larger than a width at the second end;
(iii) a diaphragm disposed above said glass substrate to cover all of said individual ink passages said diaphragm for forcing out ink in the individual ink passages when said diaphragm is bent or deformed; and
(iv) diaphragm displacing means disposed on said diaphragm above said individual ink passages for displacing portions of the said diaphragm which correspond to said individual ink passages; and
(e) a capping mechanism for cleaning and accommodating said ink jet printing heads.

13. An apparatus incorporating an ink jet printing head according to claim 12, further comprising a plate which is attached to a surface of the front end of said glass substrate and which is provided with circular holes communicating with each end portion of said individual ink passages.

14. An apparatus incorporating an ink jet printing head according to claim 12, wherein said diaphragm displacing means in said ink jet printing head includes:
individual piezoelectric elements which are fixed to said diaphragm so as to correspond to said individual ink passages, respectively; and
an electrode group for applying an electric field to said individual piezoelectric elements including a first electrode formed between said individual piezoelectric elements and said diaphragm, and a second electrode formed above said individual piezoelectric elements.

15. An apparatus incorporating an ink jet printing head according to claim 14, wherein one of said first and second electrodes includes a common electrode, and other of said first and second electrodes includes individual electrodes.

16. An apparatus incorporating an ink jet printing head according to claim 12, wherein said diaphragm displacing means in said ink jet printing head includes:
a piezoelectric element fixed to said diaphragm to cover the upper portions of the pressure chambers of all of said individual ink passages, and which is provided on an upper surface, an under surface, or both surfaces, with grooves extending in the direction of said array at the portions corresponding to the portions between adjacent pairs of said individual ink passages; and
an electrode group for applying an electric field to said piezoelectric element, the group including a first electrode formed between said piezoelectric element and said diaphragm, and second electrodes formed between each adjacent pair of said grooves.

17. An apparatus incorporating an ink jet printing head according to claim 12, wherein said apparatus is an ink jet printer.

18. An apparatus incorporating an ink jet printing head comprising:
(a) a paper tray on which paper is placed in multilayers;
(b) a conveyor for conveying said paper which is supplied from said paper tray;
(c) rollers for feeding said paper on said conveyor to a next stage;
(d) a plurality of ink jet printing heads which are provided in a line across said conveyor to jet ink onto said paper which is fed by said rollers, each of said ink jet printing heads including:
(i) a glass substrate,
(ii) a plurality of individual ink passages formed in an array on said glass substrate such that each of said individual ink passages extends from one end of said glass substrate to a forward end of said glass substrate, and such that a depth of at an end of each of said individual ink passages at said forward end is larger than a width,
(iii) a diaphragm disposed above said glass substrate covering all of said individual ink passages to force out in the individual ink passages when said diaphragm is bent or deformed, and
(iv) diaphragm displacing means disposed on said diaphragm above said individual ink passages for displacing portions of the said diaphragm which correspond to said individual ink passages;
wherein a ratio of said depth and said width is at least 2; and
(e) a capping mechanism for cleaning and accommodating said ink jet printing heads,
wherein said diaphragm displacing means in said ink jet printing head includes:
a piezoelectric element positioned over the diaphragm at portions adjacent portions of said individual ink passages; and
a first electrode disposed on an upper surface of said piezoelectric element and a second electrode disposed on a lower surface of said piezoelectric element such that the first and second electrodes sandwich said piezoelectric element at portions corresponding to said individual ink passages to apply an electric field to corresponding portions of said piezoelectric element.

19. An apparatus incorporating an ink jet printing head according to claim 18, wherein one of said first and second electrodes is a common electrode, and the other of said first and second electrodes includes individual electrodes.

20. An ink jet printing head fed ink by a common ink passage, the head comprising:
a glass substrate having an edge; and
a plurality of individual ink passages each having a common ink passage end and a nozzle end, each ink passage having at the nozzle end a respective nozzle, the ink passages formed in the glass substrate in a linear array along a first direction, each ink passage extending from the common ink passage at the common ink passage end to the respective nozzle at the nozzle end, wherein each of the individual ink passages includes:

a pressure chamber fluidly coupled to the common ink passage and extending in a direction perpendicular to the first direction, a tapered portion fluidly coupled to a respective pressure chamber, wherein tapered portions corresponding to the plurality of individual ink passages converge from the common ink passage end to the nozzle end, so that distance from a first pressure chamber to a last pressure chamber in the array is greater than the distance from a first nozzle corresponding to the first pressure chamber to a last nozzle corresponding to the last pressure chamber, and wherein the nozzles are in an array centrally positioned relative to the pressure chambers, and an end portion connected to the tapered portion and defining the respective nozzle, and wherein a depth of the end portion is greater than a width of the end portion.

* * * * *